E. KOTTUSCH.
PISTON.
APPLICATION FILED JULY 19, 1918.
1,376,705.
Patented May 3, 1921.
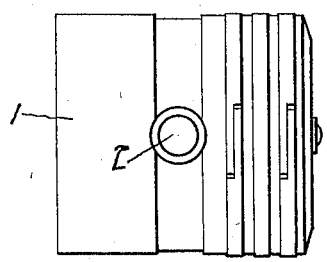
Fig.1.
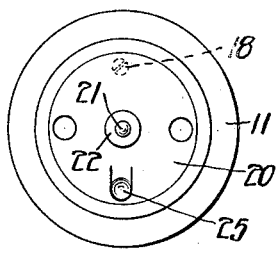
Fig.3.
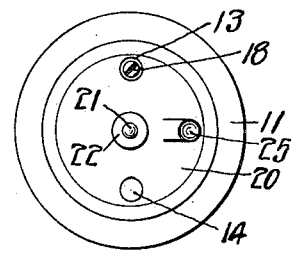
Fig.2.
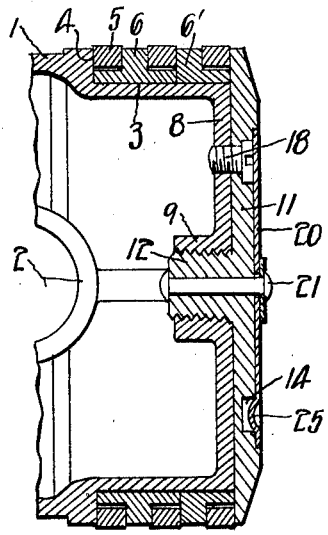
Fig.4.
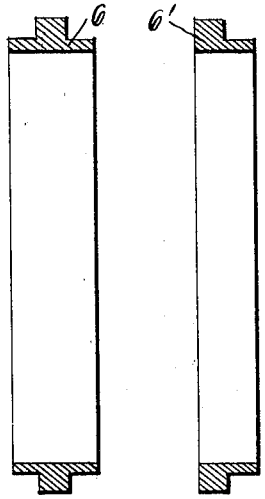
Fig.5.
Fig.6.
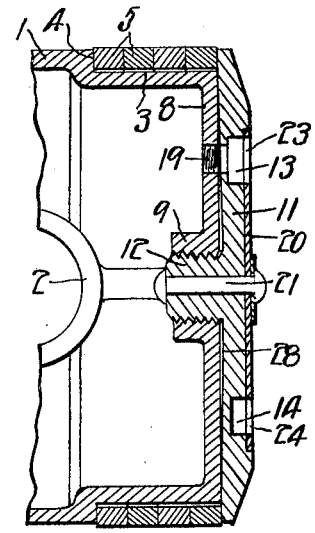
Fig.7.
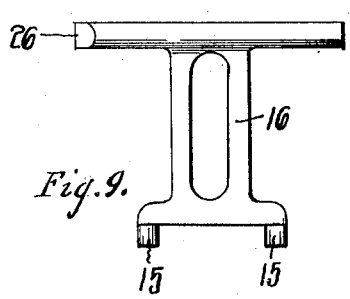
Fig.9.
Fig.10.
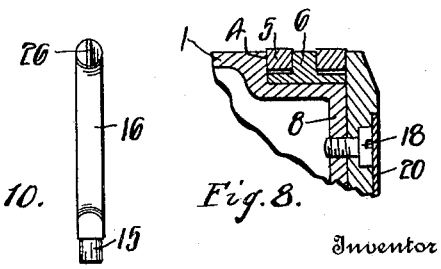
Fig.8.
Inventor
Emil Kottusch
By *Pagelsen & Spencer*
Attorneys

UNITED STATES PATENT OFFICE.

EMIL KOTTUSCH, OF DETROIT, MICHIGAN.

PISTON.

1,376,705.  Specification of Letters Patent.  Patented May 3, 1921.

Application filed July 19, 1918. Serial No. 245,595.

*To all whom it may concern:*

Be it known that I, EMIL KOTTUSCH, a citizen of the United States, and residing at Detroit, in the county of Wayne and State of Michigan, have invented a new and Improved Piston, of which the following is a specification.

In ordinary internal combustion engines the grooves for the rings are cut into the piston, and the rings are spread to pass over the end of the latter and finally allowed to snap themselves into the corresponding groves. This procedure distorts or bulges the rings and impairs the fit, thus resulting in a loss in compression and in the passage of oil into the cylinder. The primary object of the present invention is to provide a piston suitable for use in internal combustion engines and so constructed that the rings may be readily placed in position or removed without spreading or distortion.

To this end the invention consists, broadly, in a piston comprising a hollow body of substantially the same thickness throughout and open at one end and having its other end reduced and provided with a detachable supplementary head forming one wall of a ring groove and serving to retain the ring or rings therein.

The invention further consists in a head of this nature threaded into the body coaxially therewith and arranged to receive a spanner wrench or the like whereby it may be attached or detached.

Again the invention consists in a removable locking pin or screw whereby the head is prevented from becoming unscrewed from the piston body; it further consists in a rotatable retainer plate for concealing the pin or screw and preventing it from working loose and getting into the firing chamber. It consists, also, in a rivet or the like whereby the retainer plate is permanently attached to the head.

It further consists in various other details of construction shown, described and claimed.

In the drawing Figure 1 is a side view showing one embodiment of the invention. Fig. 2 is an end view, the retainer plate being in position to allow access to the locking screw, or to allow the application of the spanner for attaching or detaching the supplemental head. Fig. 3 is a similar view, the retaining washer being in locked position. Fig. 4 is a fractional central longitudinal section corresponding to Fig. 1. Figs. 5 and 6 are sections showing the spacer rings which appear in Fig. 4. Fig. 7 is a view, similar to Fig. 4 showing a modification; the relation of the inner surface of the head to the adjacent end of the body before the final turn is given to the head is also brought out. Fig. 8 shows a further modification. Figs. 9 and 10 are elevations of a desirable form of spanner wrench for manipulating the parts.

The hollow body 1 of the piston, which is preferably of substantially the same thickness throughout, is bossed and pierced transversely at 2 to receive a connecting rod pin in the usual way; at its firing end the body is reduced and machined to form a cylindrical surface 3 and a shoulder 4 for the piston rings 5 and spacers 6—6' the latter of which may be omitted (Fig. 7). The end wall 8 of the body is provided with an internal boss 9 threaded co-axially with the piston. The outer surface of the wall 8 is preferably perpendicular to the axis of the body.

Arranged to be attached to or detached from the body is a disklike supplementary head 11 which has integral therewith a threaded stud or projection 12 adapted to be received in the boss 9. The disk or head is perforated at 13 (Fig. 7) and has in its outer surface a depression 14, preferably diametrically opposite the perforation, these openings being adapted to receive the jaws 15 of a spanner or wrench 16 whereby angular movement may be imparted to the head. When the head is screwed up tight on the body, a locking screw 18 is inserted through the perforation 13 and into the threaded hole 19 in the wall 8.

Were no means provided to prevent it, it is evident that the screw 18 might work loose and get into the combustion chamber. Various means might be used for this purpose but it is preferred to employ the device shown since it is compact, inexpensive and reliable. This device consists in a lock washer or retaining plate 20 which is preferably inset into the outer face of the head and is rotatable about a rivet 21 that passes centrally through said head. The retaining plate is perforated at points 23 and 24 corresponding to the perforation 13 and depression 14, and is provided with an offset or tongue 25 spaced angularly therefrom. When the retainer is in the position indicated in Fig. 2, the locking screw 18 may be inserted or removed, as by the driver 26 on the spanner, and the supplemental head may be screwed on or off; however, when the retainer has been revolved on the rivet sufficiently to cause the element 25 to snap into the depression 14, the screw 18 is concealed and prevented from working out and the lock washer is prevented from turning.

As stated above, the outer surface of the wall 8 is preferably a plane perpendicular to the axis of the body. It is evident that, were the inner surface of the head 11 of the same configuration, the proper bearing contact between the two might not be secured when the hole 13 comes into alinement with the hole 19. The head 11 is therefore preferably undercut slightly, as shown at 28, Fig. 7, so that the outer portions of the surfaces engage one another first after which a further turning of the head causes the central part thereof to be drawn inward until a proper registration is secured. The resiliency of the head of itself thus tends to prevent rotation. The same result might obviously be secured by cutting away the central portion of the wall 8 of the head. It is evident that various modifications, other than those shown and described, might be made without departing from the spirit of the invention, and I do not, therefore, wish to be limited otherwise than as indicated by the subjoined claims.

I claim:—

1. In combination with a hollow piston body and a supplemental head overlapping said body to form one wall of a groove for a piston ring, a ring in said groove, a screw passing through the head and threaded into the body, and rotatable means carried by the head for covering said screw and preventing it from working loose.

2. A piston having a hollow body with a thin end wall having a central threaded boss, a head threaded into said boss and overlapping the body to form one wall of a groove for a piston ring, a ring in said groove, means for preventing the head from unscrewing from the body, a rivet passing centrally through the head, and a metal disk rotatable on the rivet for covering said means.

3. A piston comprising a body and a head threaded thereon and forming one wall of a circumferential groove, a ring in the groove, a screw passing through the head and threaded into the body to prevent the head from unscrewing, and a sheet metal retainer plate rotatable on the head and adapted to overlap the screw when in one position, said plate and head being mutually interengaged to hold the plate in the position named.

4. A piston comprising a body and a head centrally threaded thereon and forming one wall of a circumferential groove, a ring in said groove, said body and head being so concave relative to each other as to initially engage each other near their outer edges as the head is being screwed onto the body and to thereafter come into fuller engagement with each other toward the common axis thereof as the head yields to the pressure of the body.

5. In combination with a hollow body of a piston, a head threaded thereon, means for preventing the head from unscrewing from the body, a member passing through the head co-axially therewith, and means held on the head by the member for retaining the first mentioned means on said head.

EMIL KOTTUSCH.